United States Patent [19]

Justice, Sr. et al.

[11] 4,239,328

[45] Dec. 16, 1980

[54] COLLAPSIBLE BINOCULAR AND BLANK THEREFOR

[76] Inventors: Harry L. Justice, Sr., 4210 Reading Rd., Richmond, Va. 23222; Harry L. Justice, Jr., 4-9-1 Yotsugi, Katsushika-ku, Tokyo 124; Yoshinori Watanuma, 3-9-6 Yahiro, Sumida-k u, Tokyo-to, both of Japan

[21] Appl. No.: 925,772

[22] Filed: Jul. 18, 1978

[30] Foreign Application Priority Data

Dec. 10, 1977 [JP] Japan ............................ 52-165884

[51] Int. Cl.³ .................................................. G02B 7/02
[52] U.S. Cl. ..................................... 350/70; 350/140; 350/71
[58] Field of Search ............................. 350/70–75, 350/96, 47, 36, 46, 140, 145; 93/36; 206/316; 229/41 B; 40/63

[56] References Cited

U.S. PATENT DOCUMENTS

| 894,665 | 7/1908 | Kissner | 350/70 |
|---|---|---|---|
| 2,789,460 | 4/1957 | Kaufman | 350/140 |
| 3,009,567 | 11/1961 | Erickson | 350/70 |
| 4,013,341 | 3/1977 | Riley | 350/70 |
| 4,080,043 | 3/1978 | Altenheiner et al. | 350/70 |
| 4,175,828 | 11/1979 | Carver | 350/140 |

Primary Examiner—John K. Corbin
Assistant Examiner—B. Wm. de los Reyes
Attorney, Agent, or Firm—Shlesinger, Arkwright, Garvey and Dinsmore

[57] ABSTRACT

A collapsible binocular and a blank for forming the same and made of semi-rigid sheet material, the binocular having front and rear lens mounting panels connected by top and bottom panels having integrally formed hinges therein, and end flaps attached to the lens mounting panels and connected at approximately the mid-point of the binocular, the top and bottom panels also including integrally formed hinges so that the binocular may be collapsed to a flat, compact package and stored within a one piece sleeve when not in use.

16 Claims, 5 Drawing Figures

U.S. Patent  Dec. 16, 1980  4,239,328
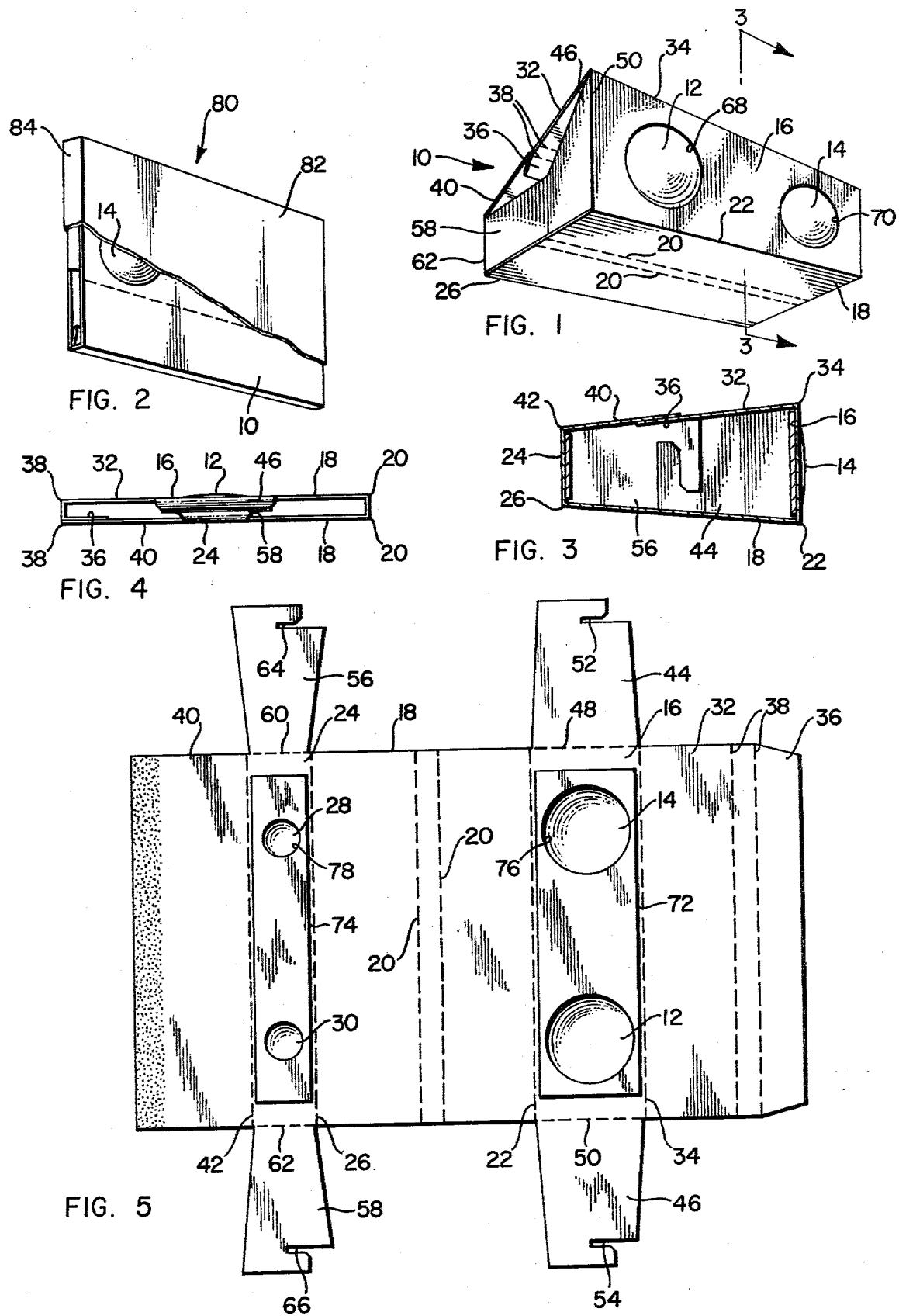

COLLAPSIBLE BINOCULAR AND BLANK THEREFOR

This invention relates to a collapsible binocular instrument, and particularly such a binocular which is formed from a semi-rigid piece of sheet material in such a way as to be extremely compact when not in use, and yet easily expanded to the useable position. Additionally, the binocular is provided with a protective sleeve when in the collapsed position.

Collapsible binoculars and similar optical instruments are quite popular at sporting events, concerts, operas, amusement parks, and the like. The use of such devices is further popularized by their generally inexpensive yet highly practical characteristics.

Yet the need for an inexpensive, compact and durable binocular remains high notwithstanding the popularity of such devices, due primarily to the popularity and great variety of events at which such devices may be used.

However, the prior art has failed to adequately fulfill all of the needs and requirements of such instruments as portable, inexpensive binoculars. A most desirable trait of such an instrument would be the capability for sale of the device in vending machines and the like, however such capabilities require a compact size when collapsed.

Accordingly, is a primary object of this invention to provide an inexpensive, compact collapsible binocular which overcomes the disadvantages of the prior art.

A further object of this invention is to provide a collapsible binocular of durable construction both in the collapsed and expanded states.

Another object of this invention is to provide a collapsible binocular which is provided with a protective sleeve for the instrument when collapsed and not in use.

Still a further object of this invention is to provide a collapsible binocular formed from semi-rigid sheet material.

Yet a further object of this invention is to provide a collapsible binocular which may be formed from an easily and inexpensively shaped blank.

Still a further object of this invention is to provide a collapsible binocular having a fixed optical length.

Still a further object of this invention is to provide a blank of semi-rigid sheet material from which the binocular of this invention is formed.

These and other objects and advantages of this invention will become apparent when considered in light of the following description and claims when taken together with the accompanying drawings in which:

FIG. 1 is a perspective view of the binocular of this invention in the expanded condition;

FIG. 2 is a perspective view of the binocular of this invention in a collapsed state with portions of the protective sleeve broken away for clarity;

FIG. 3 is a cross-sectional view along the lines 3—3 of FIG. 1 and viewed in the direction of the arrows;

FIG. 4 is a side view of the binocular in the collapsed condition; and

FIG. 5 is a plan view of the blank from which the binocular is formed.

Referring now to the drawings, with particular reference to FIG. 1, the binocular of this invention is shown in its expanded state, ready for use and generally designated 10. The binocular is seen to include a pair of objective lenses 12 and 14 mounted in an objective lens mounting panel 16. The panel 16 is connected to a bottom panel 18 which is provided with two closely spaced, parallel fold lines 20.

The bottom panel 18 is connected to the objective lens mounting panel 16 at a score or fold line 22.

The bottom panel 18 is also connected at its other side to an ocular lens mounting panel 24 through a score or fold line 26. The panel mounts a pair of ocular lenses 28 and 30 therein, so that the optical axes of lenses 12 and 14 are coincident with the optical axes of lenses 28 and 30.

A top wall for the binocular 10 is formed by a first top wall panel 32 connected to the objective lens mounting panel 16 along a score or fold line 34. Additionally, the panel 32 is provided with a glue flap 36, and a pair of closely spaced parallel fold or score lines 38. Preferably, the score lines 38 are spaced from the objective lens mounting panel 16 the same distance as are the fold lines 20. Additionally, it is preferred that the glue flap 36 be adjacent to the score line 36 which is farthest from the panel 16.

A second top panel 40 is connected to the ocular lens mounting panel 24 at a fold or score line 42.

As best seen in FIG. 3, the glue flap 36 overlaps a portion of the panel 40 and is secured thereto by any suitable adhesive.

The objective lens mounting panel 16 is provided at each end thereof with end flaps 44 and 46. As best seen in FIG. 5, these end flaps are preferably trapezoidal in shape, and of their two parallel sides, the longer side of each end flap is connected to the panel 16 along fold or score lines 48 and 50. Additionally, each end flap 44 and 46 is provided with notches 52 and 54 the purpose for which will become clear hereinafter.

The ocular lens mounting panel 24 is provided with a pair of trapezoidal end flaps 56 and 58, of which the shorter of the parallel sides is attached to the panel 24 along score or fold lines 60 and 62. The end flaps 56 and 58 are also provided with notches 64 and 66 similar to notches 52 and 54.

The lens mounting panels 16 and 24 are provided with apertures 68 and 70 respectively which are slightly smaller in diameter than the respective lenses 12 and 14, and 28 and 30. On the inside of the lens mounting panel 16 and 24, the lenses are positioned over the apertures 68 and 70, and separate panels 72 and 74 having corresponding apertures 76 and 78 are placed over the lenses with apertures 76 and 78 in register with apertures 68 and 70 and lenses 12, 14, 28 and 30. The panels 72 and 74 are then secured to panels 16 and 24 respectively by any suitable means, preferably adhesive. This construction retains the lenses in their proper position within the binocular.

The binocular is preferably made from a semi-rigid sheet material of appropriate qualities of rigidity and durability. Particularly suitable is cardboard which may be readily folded and scored at the appropriate places to provide integral hinges in the positions of the fold lines or score lines 20, 22, 26, 34, 38, 42, 48, 50, 60, 62, as described above. Whether these lines are actually fold lines or score lines may to some extent depend upon the nature of the material from which the binocular is made, since for cardboard, the lines are typically referred to as score lines wherein the cardboard sheet material is "scored" whereas for a suitable plastic material having an integral hinge therein fold lines would be more appropriate. Thus these terms are used interchangeably in the specification to indicate a line along which a fold may be made, whether the line is made by scoring or otherwise.

The blank of FIG. 5 is assembled into the binocular by first folding along lines 22 and 26 so that panels 16 and 24 are substantially at right angles to panel 18. At this point, flaps 44 and 56 are connected by interleaving notches 52 and 64. Additionally, flaps 46 and 58 are similarly joined by interleaving notches 54 and 66. The flaps 44, 46, 56 and 58 are preferably each slightly longer than one-half the distance between the lens mounting panels 16 and 24. In this manner, when the binocular is assembled, the end flaps form an end wall which is bowed slightly inwardly of the binocular as best seen in FIG. 1. In this manner, the top and bottom walls of the binocular are firmly supported along two non-parallel, coplanar edges at each corner. It has been found that this provides better support and the top and bottom walls of the binocular may not be as easily compressed. This construction also provides a fixed optical length for the optical system and eliminates minor variations in the length.

Additionally, preferably, the ocular lens mounting panel 24 is narrower than the objective lens mounting panel 16 to provide a streamline, tapered or wedge-shaped appearance. The end flaps 44, 46, 56, and 58 must therefore be of a trapezoidal shape as shown in FIG. 5. The end panels 44 and 46 therefore must have the longer of the parallel sides of the trapezoid attached to the lens mounting panel 16, while the panels 56 and 58 must have the shorter of the parallel sides of the trapezoid attached to the ocular lens mounting panel 24.

After the end flaps are connected as described above, the flaps 32 and 40 are folded along lines 34 and 42, and are connected by means of glue flap 36 which is adhesively secured to the panel 40. At this point, the binocular has the appearance as best seen in FIG. 1, and is ready for use for distance viewing.

When desired, the binocular 10 may be readily collapsed by pressure on panels 16 and 24 urging these two panels together. If necessary, light pressure may be applied outwardly on the top and bottom panels. When light pressure is applied as indicated, the top and bottom walls deflect outwardly away from each other and bend along score lines 20 and 38. Simultaneously, end flaps 44, 46, 56 and 58 deflect inwardly. When the panels 16 and 24 are close together, the thickness of the collapsed binocular is approximately equal to the distance between score lines 20—20 and 38—38. This allows clearance for the end flaps 44, 46, 56 and 58 and the lenses and attaching panels 72 and 74. The binocular then has an appearance as best seen in FIG. 4.

When in the collapsed state, the binocular has a very thin profile and may be inserted in a sleeve 80 for storage, protection or the like. The sleeve 80 has two large panels 82 connected by two smaller end panels 84, and is open at the remaining two ends. The binocular 10 is simply slid into the sleeve 80 when in the collapsed position, and may be readily removed therefrom and expanded for use.

While this invention has been described as having a preferred design, it will be understood that it is capable of further modification. This application, is, therefore, intended to cover any variations, uses, or adaptations of the invention following the general principles therefore and including such departures from the present disclosure as come within known or customary practice in the art to which this invention pertains, and as may be applied to the essential features hereinbefore set forth and fall within the scope of this invention or the limits of the claims.

What is claimed is:

1. A collapsible binocular having a housing formed of semi-rigid sheet material comprising:
   front and rear lens mounting panels,
   top and bottom panels, each being hingedly connected to both of said lens mounting panels, said top and bottom panels each having a pair of transverse fold lines substantially parallel to and spaced from said lens mounting panels,
   each of said lens mounting panels being provided with end flaps at each end thereof hingedly connected therewith, the end flaps of the rear lens mounting panel being hingedly connected to the end flaps of the front mounting panel for forming end walls of said binocular,
   whereby pressure application on said lens mounting panels urging said lens mounting panels toward each other causes outward deflection of said top and bottom panels and folding of said top and bottom panels along said transverse fold lines for collapsing said binocular and the collapsed binocular having a thickness approximately equal to the spacing of the lines of said pairs of fold lines.

2. A collapsible binocular as in claim 1 and wherein:
   said front and rear lens mounting panels, said top and bottom panels, and each of said end flaps are each formed in a single sheet of said semi-rigid sheet material.

3. A collapsible binocular as in claim 2 and wherein:
   said end flaps are hingedly connected to said lens mounting panels along fold lines in said sheet material.

4. A collapsible binocular as in claim 2 and including:
   a pair of objective lenses mounted in said front lens mounting panel and a pair of ocular lenses mounted in said rear lens mounting panel.

5. A collapsible binocular as in claim 4 and wherein:
   each of said end flaps are hingedly connected to their respective lens mounting panels along fold lines, said end walls having a length slightly greater than the distance between said lens mounting panels whereby said end walls are slightly inwardly displaced when said housing is fully expanded.

6. A collapsible binocular as in claim 5 and wherein:
   said front lens mounting panel is slightly wider than and the same length as said rear lens mounting panel.

7. A collapsible binocular as in claim 2 and including:
   a one piece sleeve formed of semi-rigid sheet material having open ends and inside length and width dimensions slightly larger than the length and width dimensions of said housing when collapsed, said housing being telescopically received in said sleeve.

8. A collapsible binocular as in claim 7 and wherein:
   said sleeve and said housing are formed of the same semi-rigid sheet material.

9. A collapsible binocular as in claim 8 and wherein:
   said semi-rigid sheet material is cardboard.

10. A collapsible binocular as in claim 2 and wherein:
    said semi-rigid sheet material is cardboard.

11. A collapsible binocular as in claim 1 and wherein:
    said housing is formed in a single sheet of said semi-rigid sheet material.

12. A collapsible binocular as in claim 1 and wherein:

said top and bottom panels are connected to said front and rear lens mounting panels along fold lines in said sheet material.

13. A blank for a collapsible binocular formed of semi-rigid sheet material and comprising:
an objective lens mounting panel of rectangular configuration and having a first top panel adjacent thereto and connected thereto at a first score lines,
a glue flap connected top said first top panel opposite said objective lens mounting panel along a pair of second score lines,
an ocular lens mounting panel,
a bottom panel connecting said objective and ocular lens mounting panels along third and fourth score lines, said bottom panel including a pair of fold lines substantially parallel to and spaced from said third and fourth score lines,
a second top panel including two score lines connected to said ocular lens mounting panel opposite said bottom panel along a fifth score line, each of said score lines being substantially parallel with, and each of said panels being of substantially the same length,
an end flap attached to each end of each said lens mounting panels,
whereby connection of said first and second top panels forms generally tubular collapsible binocular closed at the ends by said end flaps and having a collapsed thickness approximately equal to the spacing of the lines of said pairs of fold lines.

14. A blank as in claim 13 and wherein:
said objective lens mounting panel is wider than said ocular lens mounting panel.

15. A blank as in claim 14 and wherein:
the end flaps associated with said ocular lens mounting panel are secured to said ocular lens mounting panel along their short parallel sides, and
the end flaps associated with said objective lens mounting panel are secured to said objective lens mounting panel along their long parallel sides.

16. A blank as in claim 13 and including:
a pair of ocular lenses and a pair of objective lenses mounted respectively in said ocular and objective lens mounting panels.

* * * * *